Patented Feb. 23, 1954

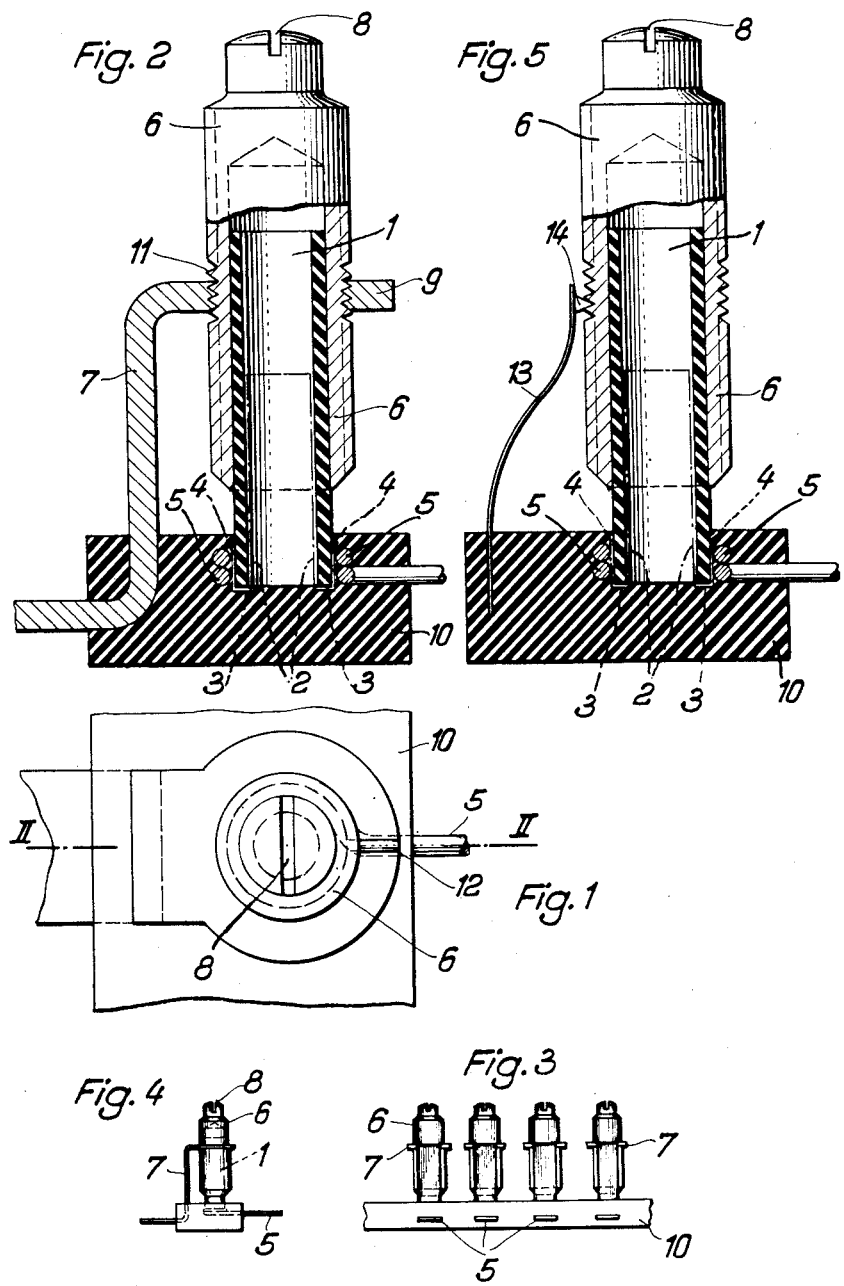

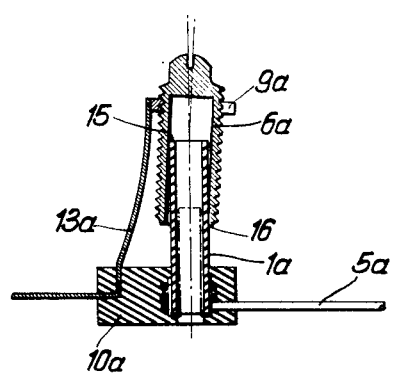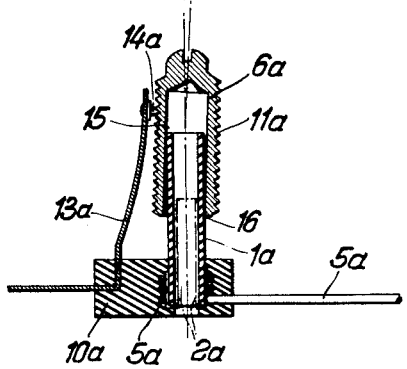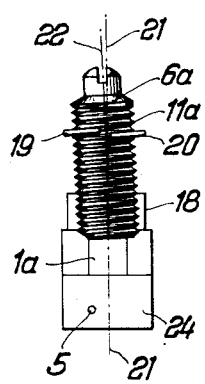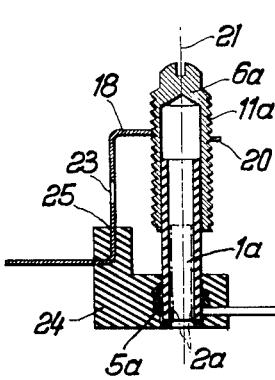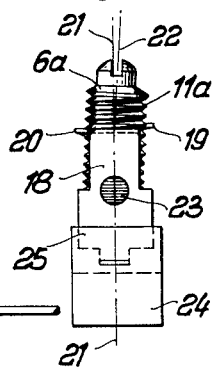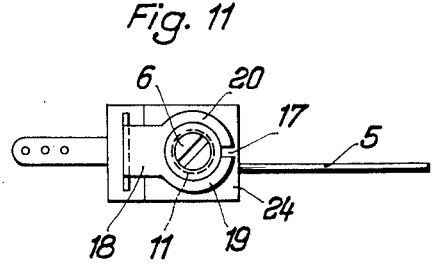

2,670,453

UNITED STATES PATENT OFFICE 2,670,453

CONTINUOUSLY VARIABLE CONDENSER

Eugen Leuthold, Neuhausen, Switzerland, and Eduard Blum, Villingen, Schwarzwald, Germany, assignors to Saba Schwarzwalder Apparate-Bau-Anstalt August Schwer Sohne, G. m. b. H., Villingen-Schwarzwald, Germany Application February 13, 1952, Serial No. 271,376

Claims priority, application Germany May 31, 1949

10 Claims. (Cl. 317—249)

1

The present invention relates to condensers.

More particularly, the present invention relates to variable condensers of the type that are used in high-frequency installations and in devices such as radios and the like.

This application is a continuation-in-part of U. S. application Serial No. 163,862, filed May 24, 1950, now abandoned, and entitled "Continuously Variable Condenser."

One of the objects of the present invention is to provide a continuously variable condenser which is more efficient than conventional condensers.

Another object of the present invention is to provide a simple and effective means for adjusting a condenser of the above type to a very fine degree.

A further object of the present invention is to provide an inexpensive variable condenser in which losses caused by loose or "wobbling" contacts are virtually eliminated.

Yet another object of the present invention is to provide a condenser of the above type which is capable of maintaining its adjusted position even though the condenser is subject to such unfavorable influences as vibrations and the like.

With the above objects in view the present invention mainly consists of a variable condenser having an electrically non-conductive support and an electrically non-conductive tube with one end thereof on said support, this tube having an inner lining of an electrically conductive material. An electrically conductive sleeve having a threaded outer surface is telescopically mounted on the tube so as to overlap, to a predetermined extent, the lining on the inner surface of the latter. An electrically conductive, springy arm is also mounted on the electrically non-conductive support, and this springy arm has an end thereof in engagement with the threads on the outer surface of the sleeve at a position beyond the tube so as to tilt the sleeve on the tube and provide frictional contact between the tube and sleeve at two spaced points on opposite sides of the tube. The sleeve is turnable with respect to the springy arm so that the overlapping relationship between the sleeve and tube lining may be regulated, and the pressure of the springy arm which tilts the sleeve on the tube maintains the sleeve in its adjusted position in a positive way, even though the condenser apparatus is subject to such an unfavorable influence as vibrations and the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a plan view of one possible embodiment of a condenser in accordance with the present invention;

Fig. 2 is a partly sectional, side elevation view of the structure of Fig. 1 taken along the line II—II of Fig. 1;

Fig. 3 shows a bank of condensers of the type illustrated in Figs. 1 and 2;

Fig. 4 is a side view of the structure shown in Fig. 3;

Fig. 5 is a view, corresponding to Fig. 2, of a different embodiment of the invention;

Fig. 6 is a side sectional view of yet another embodiment of the present invention;

Fig. 7 is a side sectional view of a still further embodiment of the present invention;

Fig. 8 is a side sectional view of one more possible embodiment of the present invention;

Fig. 9 is an elevational view of the structure of Fig. 8 as seen from the right hand side thereof;

Fig. 10 is a side elevational view of the structure of Fig. 8 as seen from the left hand side thereof; and Fig. 11 is a plan view of the structure of Fig. 8.

Referring now to the drawings, there is shown in Figs. 1 and 2 an electrically non-conductive support 10 for a condenser-apparatus constructed in accordance with the present invention. This support 10 may be made from any suitable insulating material such as any one of a number of plastics, for example.

An electrically non-conductive tube 1 has an end thereof embedded in the support 10. This tube 1 may be made from a ceramic material, for example. An electrically conductive lining is located against the interior surface of the tube 1, as is shown by the dot-dash line 2, this lining extending something over half way up the tube while leaving an appreciable area on the inner surface of the tube, adjacent the top thereof, unlined. The electrically conductive lining 2 has a portion 3 thereof extending over the bottom end of the tube 1 and has a portion 4 thereof extending for a short distance upwardly along the outer surface of the tube 1. These portions 3 and 4 of the electrically conductive lining are located beneath the top face of support 10.

A conductor 5 has an end portion thereof embedded in the support 10 and located about lining portion 4, this conductor 5 having the coils at the left end thereof, as viewed in Fig. 2, electrically joined to the lining portion 4 by any suitable means such as soldering or the like. The conductor 5 thus forms one lead of the condenser apparatus.

An electrically conductive sleeve 6, made of any suitable electrically conductive material, such as copper, for example, is telescopically mounted on the tube 1 for sliding movement therealong, this tube 6 having a nice, sliding fit on the tube 1 so that play between tube 1 and sleeve 6 is substantially eliminated. The outer surface of the sleeve 6 is provided with threads 11, and the top end thereof is formed with a slot 8 so that the sleeve 6 may be turned by means of a screw driver, or the like.

An electrically conductive arm 7 has a portion thereof embedded in the support 10 and has an end 9 thereof in the form of a split nut the gap 12 of which is shown in Fig. 1. The material from which the arm 7 is made, in addition to being electrically conductive, is also springy and the arcuate arms of the split nut 9 resiliently engage the threads 11 so as to press inwardly against the same and in this way provide a secure mounting for the sleeve 6 in its adjusted position. This arm 7, which may for example be made of copper or the like, thus forms the other lead for the condenser apparatus. It will be noted that the arm 7 has a thickness greater than the space between adjacent threads 11 so that the sleeve 6 cannot be moved in translation. It must be turned with respect to the arm 7 in order to change its overlapping relation with the lining 2, and the springy action of the split nut portion 9 frictionally resists the turning of the sleeve 6 so that a much finer adjustment can be provided than if the sleeve 6 were mounted so as to be easily turnable on the arm 7. The large area of contact between the threads of nut portion 9 and the threads 11 not only provides a superior electrical contact between the sleeve 6 and arm 7 but also prevents the threads 11 from becoming injured and greatly increases the life of the condenser apparatus.

Fig. 3 shows a bank of condensers of the above described construction mounted on support 10 and having the leads 5 extending therefrom. Fig. 4 shows the bank of condensers illustrated in Fig. 3 in side view.

Fig. 5 shows an embodiment of the invention which is the same as that shown in Figs. 1–4 except for the arm 7 and split nut 9. These latter members are replaced in the embodiment of Fig. 5 by the springy arm 13 and the wedge-shaped, pin member 14 fixedly mounted on the arm 13 adjacent the upper free end thereof. Both of these members 13 and 14 are electrically conductive, and the member 14 is urged against the threads of sleeve 6 by the spring action of arm 13 so that this member 14 frictionally engages the threads of sleeves 6 to maintain the same in a predetermined position on the tube 1 in much the same way that the sleeve 6 of Fig. 2 is maintained on the tube 1. Thus, in the embodiment of Fig. 5, the members 13 and 14 form one of the leads of the condenser apparatus in the same way as the arm 7.

In the embodiments of the invention which are illustrated in Figs. 6–11, there are essential differences with respect to those embodiments illustrated in Figs. 1–5 in that the sleeves 6a of the embodiments of Figs. 6–11 are more loosely mounted on the tubes 1a than is the case with the sleeves and tubes of the embodiments of Figs. 1–5 and the threads 11a of the sleeves 6a are engaged only beyond the tube 1a and not at a point opposite the latter as is the case with the embodiments illustrated in Figs. 1–5.

In the embodiment of the invention which is illustrated in Fig. 6, the springy arm 13a, which is electrically conductive and which has an upper end resiliently pressing toward the sleeve 6a, has fixedly mounted, at the upper free end thereof, an electrically conductive split nut member 9a similar to the split nut 9 described above. The springy action of arm 13a causes the sleeve 6a to assume a slightly tilted position with respect to the tube 1a so that the sleeve and tube frictionally engage each other at points 15 and 16 on opposite sides of the tube 1a. This frictional contact at points 15 and 16 makes the tube 6a fairly difficult to turn so that it maintains its adjusted position even though the condenser apparatus is subject to such unfavorable influences as vibration and the like. With the exception of the above-discussed structure, the embodiment of Fig. 6 includes the same structure as the embodiments of Figs. 1–5, that is, the support 10a, the lead 5a, the non-conductive tube 1a, and the electrical conductive lining mounted thereon are identical with the support 10, the lead 5, the tube 1, and the electrically conductive lining 2 described above.

The embodiment of the invention which is illustrated in Fig. 7 is different from that illustrated in Fig. 5 in that the split nut 9a is replaced by a wedge-shaped, electrically conductive pin member 14a which engages the threads 11a of sleeve 6a. The resiliency of arm 13a pushes the pin 14a into the threads 11a, and since the pin 14a is located above the tube 1a, the sleeve 6a is tilted to provide frictional contact at 15 and 16 in the same way as the embodiment of Fig. 6 described above.

In the embodiment of the invention which is illustrated in Figs. 8–11, the support 10 is replaced by a support 24, and the arm 13a is replaced by an electrically conductive arm 18 embedded at 25 in the electrically non-conductive support 24 and having a pair of arcuate arms 19 and 20. The arcuate arms 19 and 20 are bent away from each other, as is clearly illustrated in Fig. 9. However, the distance by which they are bent away from each other is less than the distance between a pair of adjacent threads 11a. The result of this feature of the invention is that when the threads 11a are turned into the arcuate arms 19 and 20, the latter tilt the sleeve 6a so that its axis is located at 22, as shown in Figs. 9 and 10, and in this way the sleeve 6a is tilted with respect to the tube 1a. It will be noted that the direction in which the sleeve 6a is tilted in the embodiments of Figs. 8–11 is different from that at which it is tilted in the embodiments of Figs. 6 and 7 by 90°. Fig. 11 shows a plan view of the embodiment of the invention illustrated in Figs. 8–10.

The arm 19 is formed with an aperture 23 to increase the resiliency of the arm 18, and the left free end of the arm 18, as viewed in Figs. 8 and 11, is provided with openings so that it may be conveniently connected to electrical leads. It will be noted that with the embodiment of Fig. 7, the pin 14a pushes into the threads 11a and provides a strong friction at the place where it engages the threads 11a. With the embodiment of Figs. 8–11 the arcuate arms 19 and 20 extend over a fairly large area so that a superior electrical contact is provided and at the same time there is no sharp pushing of an element, such as pin 14a, into the threads. With the embodiment of Figs. 8–11, the same type of frictional engagement at two spaced points on opposite sides of tube 1a takes place so that the above described advantage of great stability of the adjusted position of sleeve 6a obtains with the embodiment of Figs. 8–11 as well as with the other embodiments described above.

It will be understood that each of the elements described above, or two or more together, may also find a useful application in other types of variable condensers differing from the types described above.

While the invention has been illustrated and described as embodied in variable condensers capable of being finely adjusted and having a great stability in their adjusted position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A condenser, comprising, in combination, a support made of an electrically non-conductive material; a tube of electrically non-conductive material fixedly mounted on said support and extending therefrom so that one end of said tube is distant from said support; an electrically conductive lining located on the inner surface of said tube; an electrically conductive sleeve loosely mounted on said tube about the outer surface thereof and extending beyond said one end of said tube, said sleeve having an outer threaded surface extending along the length thereof; and an electrically conductive, springy arm fixedly mounted on said support at one side of said tube and sleeve and having an end portion engaging and pressing against said outer threaded surface of said sleeve at a part thereof located beyond said one end of said tube on the side thereof opposite from said support, so that said sleeve may be adjustably moved on said tube by turning said sleeve with respect to said end portion of said arm and so that said arm tends to tilt said sleeve on said tube to provide a substantial frictional engagement between said sleeve and tube, said arm thus serving simultaneously as sole outer support for said sleeve member and as a contact member therefor.

2. A condenser, comprising, in combination, a support made of an electrically non-conductive material; a tube of electrically non-conductive material fixedly mounted on said support and extending therefrom so that one end of said tube is distant from said support; an electrically conductive lining located on the inner surface of said tube; an electrically conductive sleeve loosely mounted on said tube about the outer surface thereof and extending beyond said one end of said tube, said sleeve having an outer threaded surface extending along the length thereof; and an electrically conductive, springy arm fixedly mounted on said support at one side of said tube and sleeve and having an end portion engaging and pressing against said outer threaded surface of said sleeve at a part thereof located beyond said one end of said tube on the side thereof opposite from said support, so that said sleeve may be adjustably moved on said tube by turning said sleeve with respect to said end portion of said arm and so that said arm tends to tilt said sleeve on said tube to provide a substantial frictional engagement between said sleeve and tube, said arm thus serving simultaneously as sole outer support for said sleeve member and as a contact member therefor, said end portion of said arm being in the form of a pin member forming part of said arm and pressing against said outer threaded surface of said sleeve by the inherent resiliency of said arm.

3. A condenser, comprising, in combination, a support made of an electrically non-conductive material; a tube of electrically non-conductive material fixedly mounted on said support and extending therefrom so that one end of said tube is distant from said support; an electrically conductive lining located on the inner surface of said tube; an electrically conductive sleeve loosely mounted on said tube about the outer surface thereof and extending beyond said one end of said tube, said sleeve having an outer threaded surface extending along the length thereof; and an electrically conductive, springy arm fixedly mounted on said support at one side of said tube and sleeve and having an end portion engaging and pressing against said outer threaded surface of said sleeve at a part thereof located beyond said one end of said tube on the side thereof opposite from said support, so that said sleeve may be adjustably moved on said tube only by turning said sleeve with respect to said end portion of said arm and so that said arm tends to tilt said sleeve on said tube to provide a substantial frictional engagement between said sleeve and tube, said arm thus serving simultaneously as sole outer support for said sleeve member and as a contact member therefor, said end portion of said arm being in the form of a resilient split ring forming part of said arm and extending about said sleeve in threaded engagement with said outer threaded surface thereof.

4. A condenser, comprising, in combination, a support made of an electrically non-conductive material; a tube of electrically non-conductive material fixedly mounted on said support and extending therefrom so that one end of said tube is distant from said support; an electrically conductive lining located on the inner surface of said tube; an electrically conductive sleeve loosely mounted on said tube about the outer surface thereof and extending beyond said one end of said tube, said sleeve having an outer threaded surface extending along the length thereof; and an electrically conductive, springy arm fixedly mounted on said support at one side of said tube and sleeve and having an end portion engaging and pressing against said outer threaded surface of said sleeve at a part thereof located beyond said one end of said tube on the side thereof opposite from said support, so that said sleeve may be adjustably moved on said tube only by turning said sleeve with respect to said end portion of said arm and so that said arm tends to tilt said sleeve on said tube to provide a substantial frictional engagement between said sleeve and tube, said arm thus serving simultaneously as sole outer support for said sleeve member and as a contact member therefor, said end portion of said arm being in the form of a resilient split ring forming part of said arm and extending about said sleeve in threaded engagement with said outer threaded surface thereof, said split ring having a thickness greater than the distance between a pair of adjacent threads of said sleeve.

5. A condenser, comprising, in combination, a support made of an electrically non-conductive material; a tube of electrically non-conductive material fixedly mounted on said support and extending therefrom so that one end of said tube is distant from said support; an electrically conductive lining located on the inner surface of said tube; an electrically conductive sleeve loosely mounted on said tube about the outer surface thereof and extending beyond said one end of said tube, said sleeve having an outer threaded surface extending along the length thereof; and a one-piece, electrically conductive, springy arm partially embedded in said support to one side of said tube and sleeve and having an end portion pressing against and located almost completely about said sleeve at a part thereof located beyond said one end of said tube on the side thereof opposite from said support so as to tend to tilt said sleeve on said tube so that said sleeve member may be adjustably moved on said tube only by turning said sleeve with respect to said end portion of said arm, said arm thus serving simultaneously as sole support for said sleeve and as contact member therefor.

6. A condenser, comprising in combination, a support made of an electrically non-conductive material; a tube of electrically non-conductive material fixedly mounted on said support, said tube having an inner surface and an outer surface; an electrically conductive lining located on the inner surface of said tube; an electrically conductive sleeve member located over said tube about the outer surface thereof, said sleeve member having an outer threaded surface extending along the length thereof; and an electrically conductive, stationary arm fixedly mounted on said support and having an end portion thereof located almost completely about said sleeve member and engaging the threads thereof so that said sleeve member may be adjustably moved on said tube only by turning said sleeve member in said end portion of said arm, said arm thus serving simultaneously as sole outer support for said sleeve member and as contact member therefor.

7. A condenser, comprising, in combination, a support member made of an electrically non-conductive material; a tube of electrically non-conductive material having one end thereof fixedly mounted on said support member and having an opposite end thereof located distant from said support member, said tube having an inner surface and an outer surface; a lining of electrically conductive material located against the inner surface of said tube in a portion thereof located adjacent to said support member; an electrically conductive sleeve member mounted over said tube along the outer surface thereof for sliding movement thereon, said sleeve member having a threaded outer surface extending along the length thereof; and a rigid, stationary, electrically conductive arm fixedly mounted in said support member and having an outer end portion in the form of a resilient split ring engaging the threads of said sleeve member and being located nearer to said support than said opposite end of said tube, whereby said sleeve member may be adjustably mounted on said tube by only turning of said sleeve member in said end portion, said arm thus serving simultaneously as sole outer support for said sleeve member and as contact member therefor.

8. A condenser, comprising in combination, a support member made of an electrically non-conductive material; a tube of electrically non-conductive material having one end thereof fixedly mounted on said support member and having an opposite end thereof located distant from said support member, said tube having an inner surface and an outer surface; a lining of electrically conductive material located against the inner surface of said tube in a portion thereof located adjacent to said support member; an electrically conductive sleeve member mounted over said tube along the outer surface thereof for sliding movement thereon, said sleeve member having a threaded outer surface extending along the length thereof; and a rigid, stationary, electrically conductive arm fixedly mounted in said support member and having an outer end portion in the form of a resilient split ring engaging the threads of said sleeve member and being located nearer to said support than said opposite end of said tube, whereby said sleeve member may be adjustably mounted on said tube by only turning of said sleeve member in said end portion of said arm, said split ring having a thickness which is greater than the distance between a pair of adjacent threads of said sleeve member, said arm thus serving simultaneously as sole outer support for said sleeve member and as contact member therefor.

9. A condenser comprising, in combination, a support having a top surface and being made of an electrically non-conductive material; a tube of non-conductive electrical material fixedly mounted, adjacent one end thereof, on said support and extending upwardly from said top surface of the same; an electrically conductive lining located on the inner surface of said tube; an electrically conductive sleeve located over said tube about the outer surface thereof, said sleeve having an outer threaded surface portion; and an electrically conductive, stationary arm fixedly mounted on said support, extending upwardly therefrom and having a bent end portion located almost completely about said sleeve and engaging said threaded surface portion thereof so that said sleeve may be adjustably moved on said tube only by turning said sleeve in said end portion of said arm, said arm thus serving simultaneously as sole support for said sleeve and as contact member therefor.

10. A condenser consisting only of a support made of an electrically non-conductive material; a tube of electrically non-conductive material having an end portion embedded in said support; an electrically conductive lining located on the inner surface of said tube; an electrical lead having an end portion embedded in said support and contacting said lining; an electrically conductive sleeve located about said tube and having an outer threaded surface portion; and a one-piece, electrically conductive arm partially embedded in said support and having an end portion located almost completely about said sleeve and engaging said threaded portion thereof so that said sleeve may be adjustably moved on said tube only by turning movement in said end portion of said arm, said arm thus serving simultaneously as sole support for said sleeve and as contact member therefor.

EUGEN LEUTHOLD.
EDUARD BLUM.

References Cited in the file of this patent

UNITED STATES PATENTS

| Number | Name | Date |
|---|---|---|
| 1,623,742 | McDonald | Apr. 5, 1927 |
| 2,102,098 | Sickles | Dec. 14, 1937 |

FOREIGN PATENTS

| Number | Country | Date |
|---|---|---|
| 440,950 | Great Britain | Jan. 6, 1936 |
| 899,778 | France | Sept. 4, 1944 |